United States Patent [19]
Kraft

[11] Patent Number: 5,365,353
[45] Date of Patent: Nov. 15, 1994

[54] PROCEDURE FOR MAKING COPIES FROM PHOTOGRAPHIC ORIGINALS

[75] Inventor: Walter Kraft, Zürich, Switzerland

[73] Assignee: Gretag Imaging, AG

[21] Appl. No.: 117,758

[22] Filed: Sep. 8, 1993

[30] Foreign Application Priority Data

Sep. 11, 1992 [DE] Germany .................. 92810698

[51] Int. Cl.$^5$ ................................. G03F 3/08
[52] U.S. Cl. .................... 358/518; 358/509; 358/506
[58] Field of Search ............... 358/518, 504, 515, 501, 358/523, 520, 505, 506, 509, 475, 510; 355/38, 77, 41

[56] References Cited

U.S. PATENT DOCUMENTS

| | | | |
|---|---|---|---|
| 2,571,697 | 10/1951 | Evans | 430/30 |
| 4,636,845 | 1/1987 | Alkofer | 358/504 |
| 4,692,797 | 9/1987 | Matsumoto | 358/518 |
| 4,829,371 | 5/1989 | Hiramatsu et al. | 358/506 |
| 4,830,501 | 5/1989 | Terashita | 358/515 |
| 4,884,102 | 11/1989 | Terashita | 355/77 |
| 4,951,084 | 8/1990 | von Stein et al. | 355/38 |
| 5,119,125 | 6/1992 | Kraft | 355/38 |

FOREIGN PATENT DOCUMENTS

| | | |
|---|---|---|
| 0312499 | 4/1989 | European Pat. Off. |
| 0475897 | 3/1992 | European Pat. Off. |
| 2912130 | 3/1979 | Germany |
| 3317818 | 11/1984 | Germany |

OTHER PUBLICATIONS

European Search Report, EP 92 81 0698, dated May 11, 1993.

I. N. Bronstein, K. A. Semendjajew, "Taschenbuch der Mathematik", 19th Edition, Harri Deutsch Publishers, Thun, 1980, pp. 772-781.

Hunt, R. W. G., "Colour reproduction by photography", Rep. Prog. Phys. 1977 40 pp. 1071-1121.

*Primary Examiner*—Edward L. Coles, Sr.
*Assistant Examiner*—Fan Lee
*Attorney, Agent, or Firm*—Burns, Doane, Swecker & Mathis

[57] ABSTRACT

The present invention relates to a process for making copies of photographic originals in a photographic copying machine, comprising the steps of sectionally scanning the original being copied by a measurement system in a measurement station of the photographic color copying machine, feeding measured light that is transmitted or remitted from each scanned section of the original being copied to a detector configuration, converting the measured light into electrical signals as a function of wavelength and intensity of the measured light, digitizing the electrical signals to obtain color data for processing in a computation and evaluation unit, and analyzing the color data in an analysis unit to establish correction values. The step of analyzing further includes steps of (a) subjecting the color data to a reversible linear or non-linear standardization transformation that is order or film type specific, (b) converting the color data into normalized color values to provide initial data for the analysis unit, (c) forming film specific normalized correction values in the analysis unit from the normalized color values, taking into account color, density, and structural characteristics of the original being copied, and (d) converting the film specific normalized correction values of the analysis unit into de-standardized correction values in a de-standardization unit that is attached to the analysis unit using a de-standardization transformation which is inverse to the standardization transformation, the de-standardized correction values also taking into account the color characteristics of the film material being copied. A required amount of copying light is determined from the de-standardized correction values in an exposure calculation unit, and copies are made from the original being copied in an exposure station based on said copying light.

17 Claims, 9 Drawing Sheets

"COLOR PLANE"($k_1, k_2$)
EXPOSURE-DEPENDENT
COLOR SHIFT

EXPOSURE ROW REPRESENTED
IN THE ORIGINAL COLOR SPACE

Fig. 5b

SAME EXPOSURE ROW
REPRESENTED IN A
ROTATED COLOR SPACE

Fig. 6

1) ACCUMULATION OF ORDER- AND FILMTYPE-SPECIFIC STATISTICS $K_0 := 0 \qquad m_0 := 0 \qquad w_0 := 0$ $K_0 := K_0 + wkk^T \qquad m_0 := m_0 + wk \qquad w_0 := w_0 + w$ $K_t := K_t + wkk^T \qquad m_t := m_t + wk \qquad w_t := w_t + w$

2) NORMALIZATION $K_0 := K_0 / w_0 \qquad m_0 := m_0 / w_0$ $K_t := K_t / w_t \qquad m_t := m_t / w_t$

3) WEIGHTING OF ORDER- AND FILMTYPE SPECIFIC STATISTICS $g_t = 1 - g_0 \qquad 0 \le g_0 \le 1$ $K := g_0 K_0 + g_t K_t \qquad m := g_0 m_0 + g_t m_t \qquad K := K - m m^T$

4) ITERATIVE CALCULATION OF PRINCIPAL EIGENVECTOR $d := (1, 0, 0)^T$ $d := Kd$ $d := d / \|d\|$

5) LIMITATION OF AMOUNT OF ROTATION

PROCEDURE FOR MAKING COPIES FROM PHOTOGRAPHIC ORIGINALS

BACKGROUND OF THE INVENTION

The present invention relates to a procedure for making photographic copies of photographic originals in a photographic color copying machine.

Today, photographic copying machines (photographic printers) are used in modern photographic laboratories to make color copies automatically from color negatives. Generally, the originals found on film strips in this equipment are scanned photo-electronically for the three basic colors of red, green, and blue in a measurement station of the photographic copying machine. The results of the measurement are evaluated and used for determining the required amount of exposure light for the copies. Then, the desired copies are made with the determined amount of exposure copying light in an exposure station of the photographic copying machine.

The procedures used for determining the amount of exposure light for the copies are based mainly on modifications of the basic principle described in U.S. Pat. No. 2,571,697. Generally, satisfactory color copies are obtained if the amount of exposure light for the copies is measured for the three basic colors in such a way that the color densities measured on the copies result on average in a neutral gray, regardless of the basic coloration of the original being copied. In this simple case, the color densities of the original that have been established for the entire original serve as a basis for controlling the exposure. This procedure, which is known as "integral correction," does not work if larger areas of the same color, namely so-called "color dominants," appear in the original, because then, for example, color-neutral areas on the original are reproduced on the copy in the color that is complementary to the dominants.

In the case of modem equipment, where the original being copied is scanned sectionally at a number of locations, attempts have been made to improve this procedure, for example, by not accounting for highly color-saturated areas in the original or giving only reduced weight to these regions in calculating the aforementioned mean values. Formulated generally, the required amounts of exposure light for the copies are determined on the basis of a color analysis of the originals, whereby the "color" of a measurement point is usually determined relative to the reference values, the so-called normal densities. Most expediently, the measured densities of color neutral regions of the original that are normally exposed are used as reference values. Another possibility exists in defining the reference values as the mean values of the three measured densities in the three basic colors for a larger number of originals.

In particular, depending upon the make, it is known that negatives have markedly different basic colorations. Therefore, it is necessary to determine a specific set of reference values for each type of film. The negatives used today are usually coded (DX-code, expanded DX-code), from which the type of film can be identified. As a result, it is easily possible to determine the given measured data and to code or adapt them on a constant basis. Another possibility is to determine the reference values for each film individually. For example, this can occur as a result of a (weighted) message about the measured values (measured densities) resulting from this film.

The procedure can be improved by using reference values that are not a function of a so-called mean density of any given measurement point. The mean density of a measurement point of the original, for example, is defined as the arithmetic mean of the three measured densities in the three basic colors of red, green, and blue. In this way, color defects of the original that are a function of the original can be accommodated. For example, this procedure is described in DE-A-29 12 130.

The outlined procedures for determining the color of originals (sections) can be viewed as simple standardization, having the objective of reducing the influence of the film-specific qualities on the color data used for the image analysis; these qualities can be a function of the type of film or also vary from job to job for a certain kind of film. It has been seen in practice, however, that the procedures based upon the determination of reference values do not provide the best possible measurements for image analysis for all types of originals being copied. This limits the reliability of the image analysis and is an important reason why satisfactory copying results are not always achieved.

Therefore, the invention is directed to creating a procedure for analyzing photographic originals being copied that provides color data for image analysis that is to a great extent independent of the film used. The procedure should make it possible to convert the color deviations in the original that were determined on the basis of image analysis into correction values for the exposure, which in turn takes into account the characteristics of the copying material. Another task that exists is to restructure the measured data in such a way that one of the coordinates in the standardized color region can serve as a norm for the lightness or "neutral density" of the original, whereas two other coordinates extend across a "color field" making it possible to analyze the pure color characteristics (color tone and saturation) of the original.

SUMMARY OF INVENTION

In accordance with the present invention, these and other concomitant problems are solved. The present invention relates to a process for making copies of photographic originals in a photographic copying machine, comprising the steps of sectionally scanning the original being copied by a measurement system in a measurement station of the photographic color copying machine, feeding measured light that is transmitted or remitted from each scanned section of the original being copied to a detector configuration, converting the measured light into electrical signals as a function of wavelength and intensity of the measured light, digitizing the electrical signals to obtain color data for processing in a computation and evaluation unit, and analyzing the color data in an analysis unit to establish correction values. The step of analyzing further includes steps of (a) subjecting the color data to a reversible linear or non-linear standardization transformation that is order or film type specific, (b) converting the color data into normalized color values to provide initial data for the analysis unit, (c) forming film specific normalized correction values in the analysis unit from the normalized color values, taking into account color, density, and structural characteristics of the original being copied, and (d) converting the film specific normalized correction values of the analysis unit into de-standardized correction values in a de-standardization unit that is attached to the analysis unit using a de-standardization transformation which is inverse to the standardization transformation, the de-standardized correction values also taking into account the color characteristics of the film material being copied. A required amount of copying light is determined from the de-standardized correction values in an exposure calculation unit, and copies are made from the original being copied in an exposure station based on said copying light.

BRIEF DESCRIPTION OF THE DRAWINGS

Other objects and advantages will become apparent from the following detailed description of preferred embodiments of the invention as described in conjunction with the accompanying drawings wherein like reference numerals am applied to like elements and wherein.

DETAILED DESCRIPTION OF THE PREFERRED EMBODIMENTS

Figure 1:
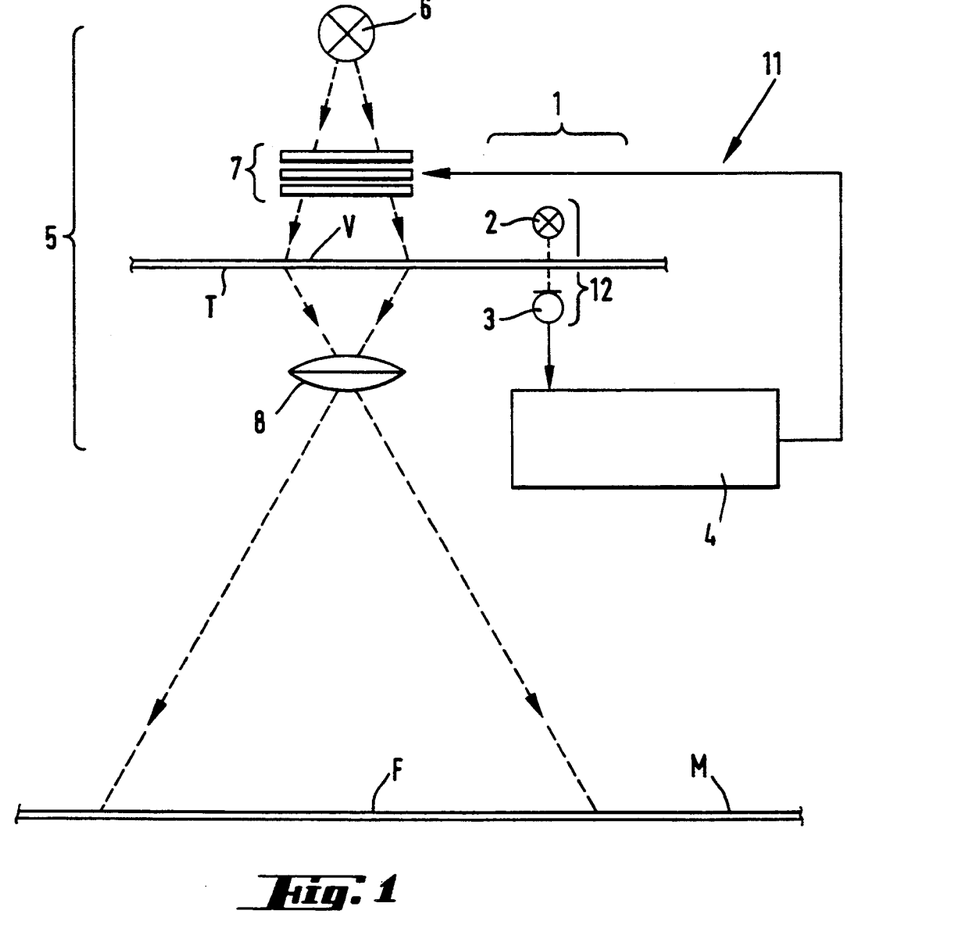
FIG. 1 shows a schematic illustration of a color copying machine.

The photographic color copying machine that is schematically depicted in FIG. 1 essentially comprises a measurement station, 1, a computation and evaluation unit, 4, and an exposure station, 5. In particular, the measurement station has a source for measured light, 2, and a detector configuration, 3. The detector configuration, 3, is designed in such a way that, on the one hand, it spectrally splits the measured light coming from a scanned area of an original being copied, V, and, on the other hand, detects the individual spectral portions, and converts them into wavelength-specific and intensity-specific electrical signals. For example, the measured light is split spectrally by three color filters using the known "three color measurement"; but it can also be done with a prism, a diffraction screen, or a spectral filter. The individual spectral sections are detected and reconfigured with a photoelectric converter, for example with a CCD image sensor (Charge Coupled Device). The photoelectric converter is attached to the computation and evaluation unit, 4, in order to transfer the measured signals. The exposure station, 5, is also connected to the computation and evaluation unit, 4. The exposure station essentially consists of a light source, 6, for the copier, a set of automatic color shutters, 7, and a reproduction-lens, 8, for projecting the original being copied, V, onto the copying material, M, to make the photographic copy.

The photographic original being copied, V, is scanned sectionally in the measurement station, 1, of the photographic color copying machine, preferably on a point by point basis, by means of a light beam from the light source, 2. The light that is transmitted or remitted from each scanned section of the original being copied, V, is fed to the detector configuration, 3, spectrally divided, and convened into electrical signals that are a function of the wavelength and intensity. The electrical signals are digitized and forwarded to the computation and evaluation unit, 4, where they are evaluated for determining the required amount of copying light, in particular for the logarithmic exposure correction, for the basic colors of blue, green, and red. The amounts of copying light for the three basic colors of blue, green, and red that have been established for the entire original being copied are transformed into control signals and forwarded to the exposure station, 5. With the aid of these control signals, the copying light source, 6, and the automatically controlled color shutters, 7, are directed in the exposure station, 5, in order to expose a photographic color copy, F, from the original being copied, V, in the copying machine using equipment which is similar to equipment of known design, such as the machine described in EP-A-312,499, corresponding to U.S. Pat. No. 4,951,084, the disclosure of which is hereby incorporated by reference in its entirety.

Figure 2:
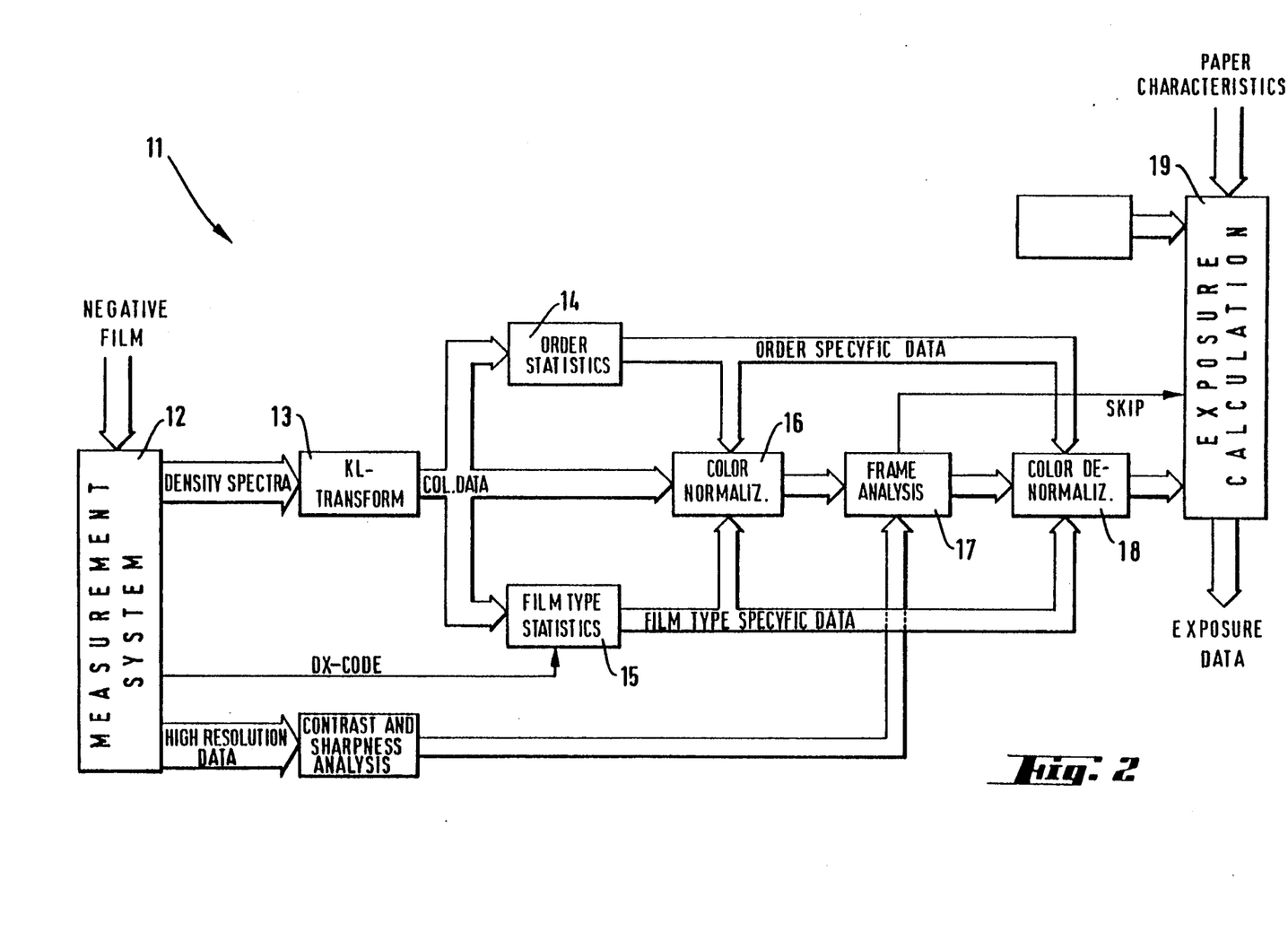
FIG. 2 shows a block diagram of an exposure control system of the photographic color copying machine, in which an exemplary procedure of the invention is used.

The light source, 2, and the detector configuration, 3, in the measurement station, 1, as well as the computation and evaluation unit, 4, constitute an exposure control system, 11, as has been realized in the high-performance printers of Gretag, AG, and as is depicted in FIG. 2. The schematic depiction is therefore limited to the elements that are essential to explaining an exemplary procedure of the invention. The exposure control system, 11, includes a measurement system, 12, which is composed of the measured light source, 2, and the detector configuration, 3, and by means of which the originals being copied, V, found on film strips, are scanned sectionally. For example, 35 spectral densities that are evenly distributed across the relevant wavelength area are determined per section.

Three "color values" $k_0$, $k_1$, $k_2$ are extrapolated from the density spectra of the scanned sections of the original as obtained from the 35 separate spectral densities in a data reduction stage designated as 13, which is an integral component of the computation and evaluation unit, 4; these color values, for example, are comparable in their three basic colors red, green, and blue, to the color densities determined with the aid of a three-color scanner. A procedure for determining the three "color values" is described, for example, in EP-A-0,475,897, corresponding to U.S. Pat. No. 5,119,125, the disclosure of which is hereby incorporated by reference in its entirety. With this known procedure, data compression is used for each density spectrum and in this way the three "color values" are determined with the aid of an orthogonal transformation "Karhunen-Loeve Transformation" or KLT).

With the aid of two evaluation units, 14 and 15, provided in the computation and evaluation unit, 4, the color values $k_0$, $k_1$, $k_2$ determined in such fashion are identified and statistically evaluated. On the one hand, statistics about the data of the actual film strip is prepared in evaluation unit 14, which is designated as order specific statistics. On the other hand, the measured data that have been converted into the color data $k_0$, $k_1$, $k_2$ serve to update constantly the so-called film type specific statistics in evaluation unit 15. In order to categorize the given measured data for a specific type of film, the film code that is imprinted or punched into the film is also identified by the measurement system, 12. Of course, the specific statistics on film type can be established by other equipment. The determined measurement data are then, for example, transferred across a data line from the given identification unit to the evaluation units, 14 and 15, or input by hand and fed in this fashion to the film-specific statistics.

The raw color values $k_0$, $k_1$, $k_2$ are then convened (e.g., normalized) into the standardized color values $k_0'$, $k_1'$, $k_2'$ in a standardizing unit, 16, of the computation and evaluation unit, 4. The standardization is based on a linear or non-linear, reversible transformation, N, which is determined from the order specific statistics or from the film type specific statistics, but perhaps also from a weighted combination of both statistics. In the latter case, the relative weighting of both statistics are made to be a function of the quantity and/or the quality of the data available for the determination of the order specific statistics.

In case the color values are based on the sectional measurement of relatively few or few representative originals being copied, then preferably a higher weight is given to the film type specific statistics.

In case the exposure control system, 11, of the photographic copier is not supposed to have an ability to directly process the resulting data for statistical purposes, then the standardization procedure can also be performed with stored film type specific transformations contained in the memory.

It is not absolutely necessary to subject the color values of all originals being copied, V, of a film to the same transformation. For example, preferably a new transformation, N, is determined at regular intervals, based upon the actual measured data from a film strip. The standardization of the color values of an original being copied, V, is first performed shortly before the original, V, is copied and the required amount of copying light has to be determined. In this way, the most current transformation, N, derived from the current measured data can be used for the standardization.

Correction values, $\Delta k$, are determined in an analysis unit (e.g., frame analysis unit 17), which is also an integral component of the computation and evaluation unit, 4, based upon the color, density, and structural characteristics of the "standardized original being copied." These correction values refer to the entire original, V, and ideally can be recognized as color deviations between the actual (standardized) original being copied, V, and an "ideal" original being copied having the same image content.

The previously established correction values, $\Delta k$, of the analysis unit, 17, that are not film specific are converted into de-standardized correction values $\Delta k'$, in a de-standardization unit, 18, that is attached to the analysis unit, 17. The de-standardized correction values, $\Delta k'$, take the color characteristics of the copying film material into account once again. In this way, it is possible to determine the amount of copying light for any original, V, in such a way that it is reproduced optimally, without film specific, exposure-specific, or object-specific (for example, whenever there are color dominants) colorations. The conversion of the standardized color values into de-standardized color values is performed with the aid of a transformation, D, which is inverse to the standardization transformation used.

Finally, the required amount of copying light or exposure correction is derived from the de-standardized correction values, $\Delta k'$, in an exposure calculation unit, 19 of the computation and evaluation unit, 4; these corrections are adapted to the copying material, M, being used. So-called paper parameters are used for making this determination; these parameters are established by means of a photographic testing process, such as described, for example, in EP-A-0,475,897, the disclosure of which is hereby incorporated by reference in its entirety. Of course, photographic testing procedures other than the one described there can be used to determine the amount of copying light required that is specific to the paper being used.

The individual data processing units, 13 to 19, are summarized in FIG. 1 for reasons of more clearly depicting the computation and evaluation unit, 4. Of course, they can also form separate structural units.

Figure 3:
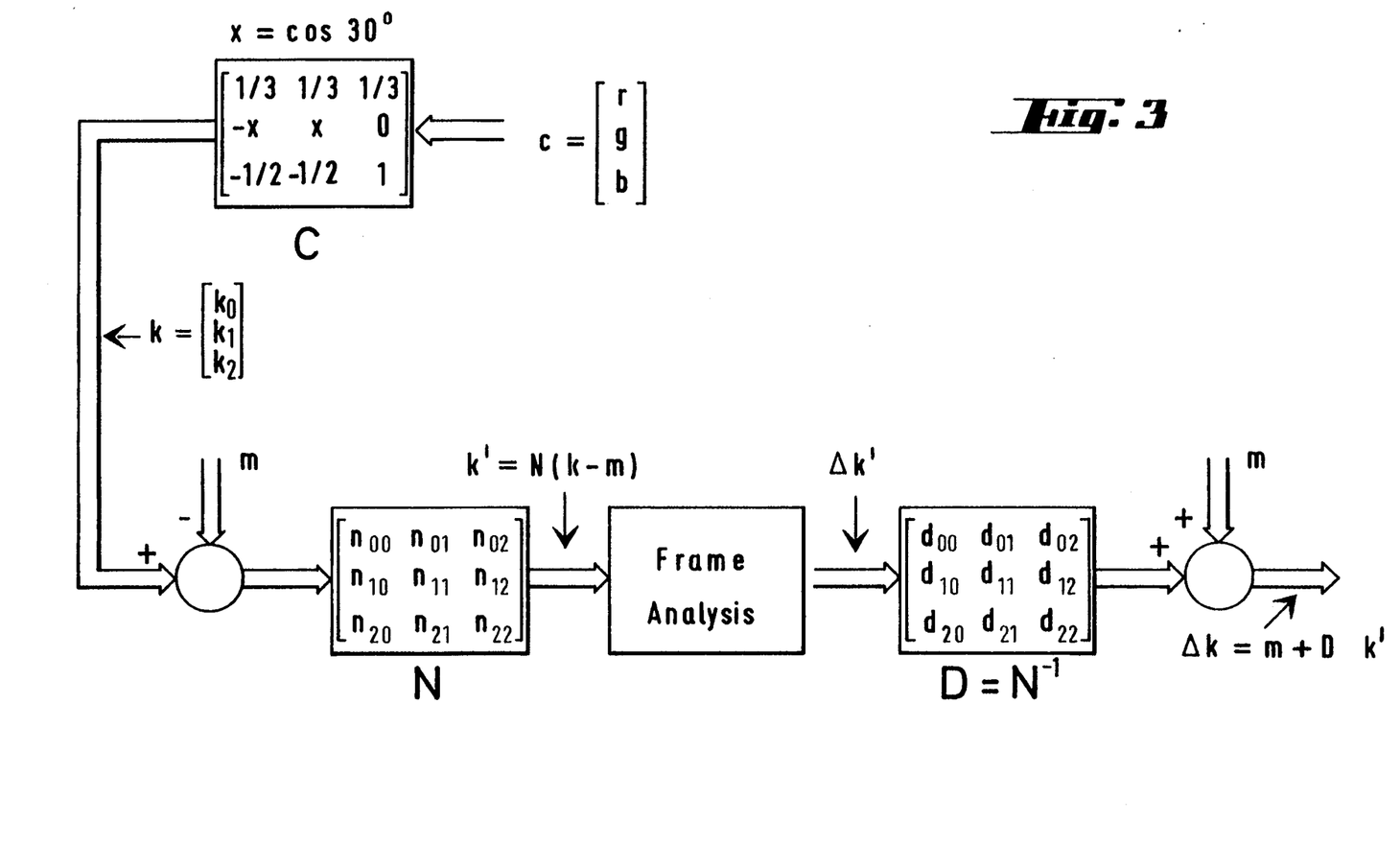
FIG. 3 shows a block diagram of a first procedural variation.

FIG. 3 contains a block diagram of a first exemplary variation of the process presented by the invention. For reasons of clarity in the illustration, only the procedural steps of importance to the invention are depicted, from a possibly required pretransformation of the measured data to the determination of the de-standardized correction values. There is no depiction here of the required procedural steps for determining the required amount of copying light from the de-standardized correction values in the exposure calculation unit, 19, because this constitutes the state of the art and, for example, takes place analogous to the procedure described in EP-A-0,312,499. In particular, it involves the simplest case of a linear standardization of the "raw" color values. It is advantageous for the analysis of the photographic original, V, if for the incoming data, one of the three color values can be identified as "neutral density" and the other two color values can be identified as "color coordinates" of an image point. If the "raw" color values fulfill this condition even approximately (for example, by using the data compression described in EP-A-0,475,897), then they can be subjected directly to standardization (initial vector k, with the components $k_0$, $k_1$ and $k_2$ in FIG. 3). The value of $k_0$ represents the "neutral density", whereas coordinate axes designated by $k_1$ and $k_2$ cover a color field. Otherwise, for example if the color values are derived with a three color scanner from the sectional scanning of the original being copied (vector c with the color densities of r, g, and b in the three basic colors of red, green, and blue in FIG. 3), then they are preferably subject first to automatic pre-transformation, C. The pre-transformation shown as an example in FIG. 3 also provides an initial vector, k, whose component, $k_0$, can be identified as "neutral density" and the arithmetic mean of the three color densities, r, g, b, are depicted in the three basic colors or red, green, and blue. The components $k_1$ and $k_2$, for example, cover the "trilineal" color level that is common in color photography.

The "raw" color values, $k_0$, $k_1$, and $k_2$, that are formulated as an initial vector, k, are now subject to a linear transformation. Preferably, a unitary matrix is used as the standardizing matrix, N, because as a result the calculation of the inverse matrix for the subsequent de-standardization $D = N^{-1}$ is reduced to a simple transposition, $D = N^T$. Furthermore, this selection results in an adaptation of D to the rotation of the color area and, therefore, can be easily interpreted. The angle of rotation that is a function of the data essentially serves to correct the exposure-specific color defect of a film and is generally small (when the pre-transformation C is correctly selected). This means that D generally does not differ very much from the standard matrix.

Therefore, preferably the pre-transformation C, if necessary, is selected in such a way that the subsequent standardization of the "raw color values" of the initial vector k can take place with a unitary matrix, which carries out a relatively slight rotation of the color field. The initial data of the standardization, summarized in the initial vector, k', are fed to the analysis unit, 17.

Figure 4:
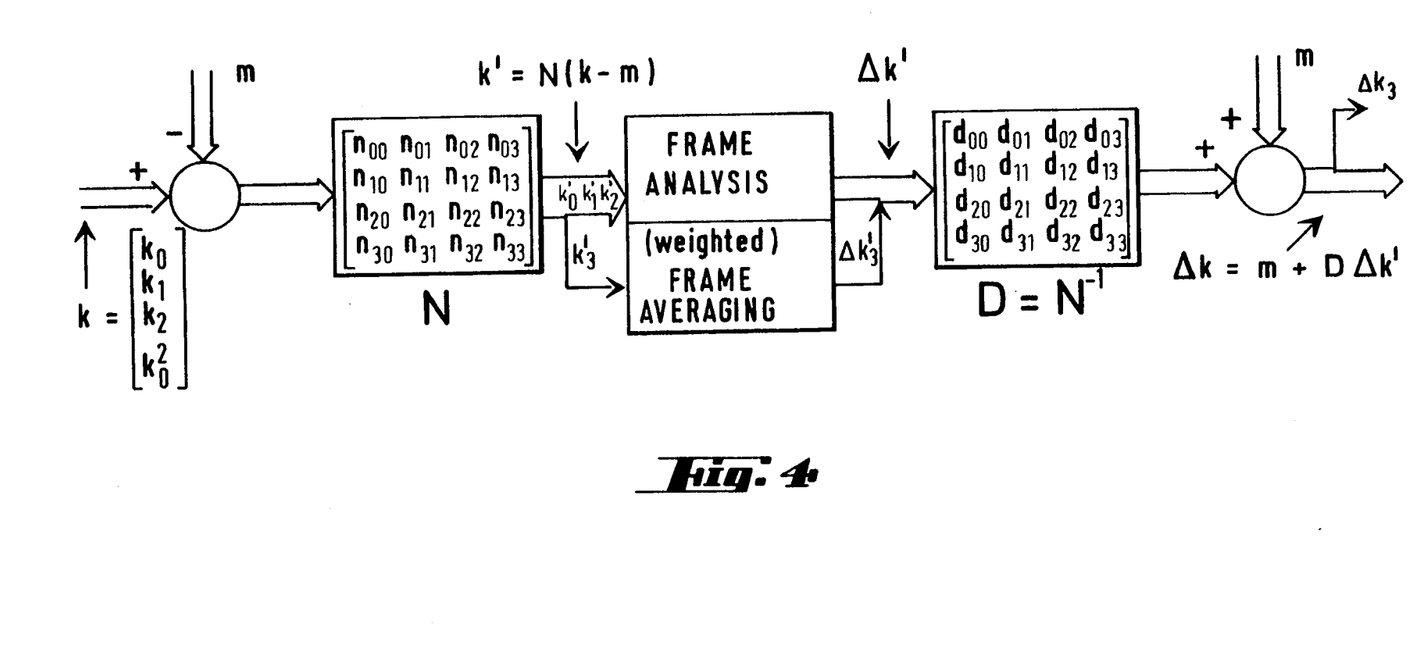
FIG. 4 shows a block diagram of a second, expanded procedural variation.

In comparison with the linear procedure depicted in FIG. 3, FIG. 4 illustrates an expanded procedure, which also accounts for non-linear functions of the color sequence of a film having the "neutral density" of $k_0$ (for example, as depicted quadratically). For this purpose, the initial vector, k, is simply expanded by the components $(k_0)^2$ and transformed into an output vector, k'. The first three components, $k_0'$, $k_1'$, and $k_2'$, of the output vector, k', describe the neutral density and the color venue of an image point and are fed, just as before, to the analysis unit, 17. The fourth components, $k_3'$, of the output vector, on the other hand, are summarized for an entire original being copied and from it the mean is calculated for the given original being copied, V. Subsequently, this mean is forwarded to the de-standardization unit along with the three-dimensional correction vector, $\Delta k'$, provided by the analysis unit, 17.

It is clear that the system shown in FIG. 4 reduces in the analysis unit, 17, to a standard transformation (output vector=input vectors) in the simplest case of a homogeneous image original and when the initially mentioned "integral correction" procedure is used.

The procedure is expanded to take into account non-linear functions that are higher than a quadratic degree, in analogous fashion and based upon the same principle.

Figure 5A:
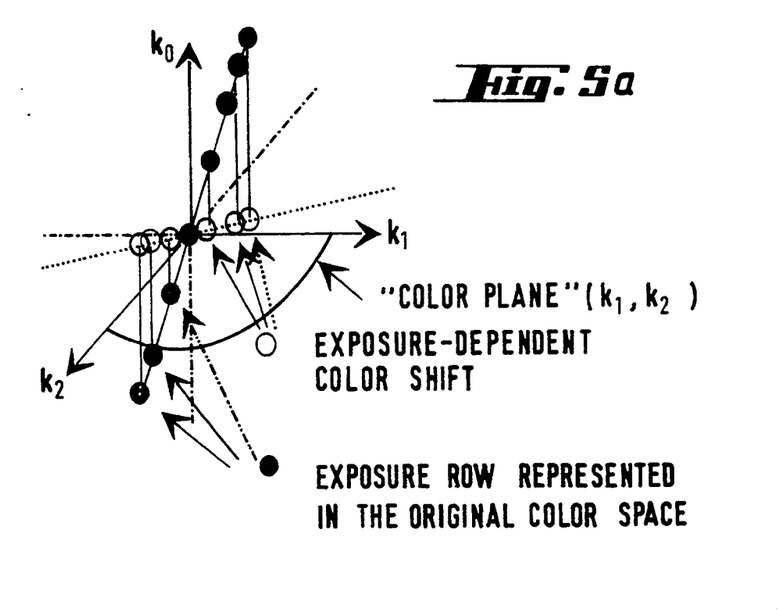
FIGS. 5a and 5b show two diagrams to depict an exemplary procedure for eliminating color defects.
Figure 5B:
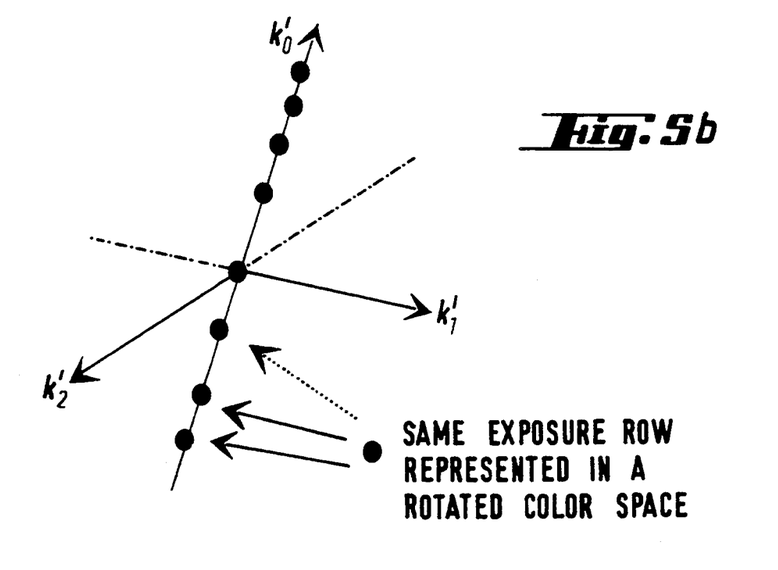
Figure 6:
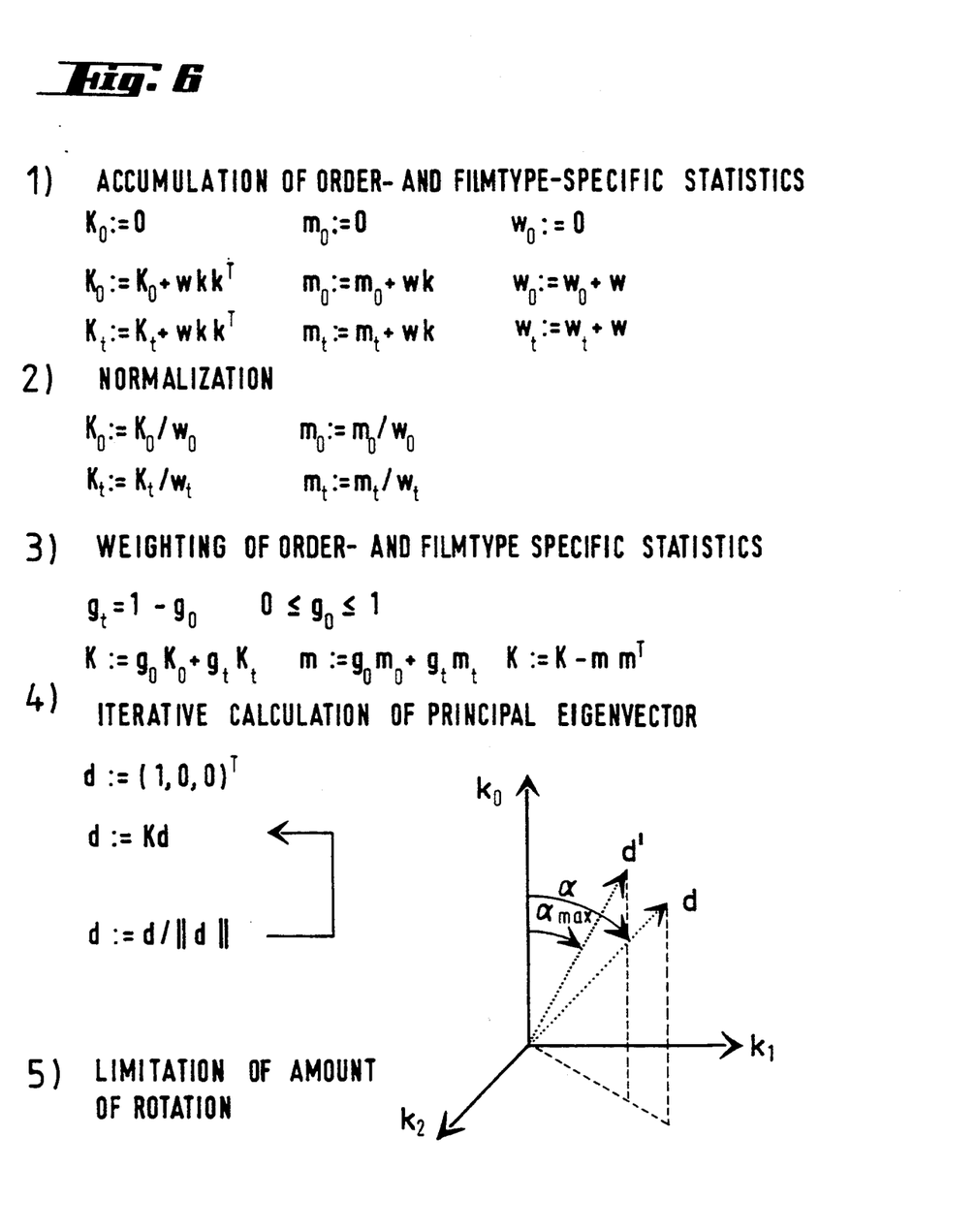
FIG. 6 shows steps employed for determining a transformation of norms as used in an exemplary procedure of the invention.

In accordance with the invention, the standardization transformation, N, is determined as a function of the order and/or film type specific measurement data. FIG. 6 illustrates a schematic sequence for determining the standardization transformation. The basis of the procedure is the simple determination that the exposure-specific color defect of a film, as it is established, for example, in the measurement of the frame series from the gray scale (FIGS. 7a and 7b), can be traced largely to the use of a film with an unsuitable color coordinate system, $k_0$, $k_1$, and $k_2$, that is measured sectionally by the measurement system, 12. FIGS. 5a and 5b illustrate this fact on the basis of an idealized example, and show that a simple rotation of the original coordinate system resulting from the color values, $k_0$, $k_1$, and $k_2$, lead to a color coordinate system, $k_0'$, $k_1'$, $k_2'$, in which the presumed color defect is eliminated.

In reality, the situation is somewhat more complicated, i.e., the measured points are generally not precisely on line, but are rather on a complicated curve in the three-dimensional color area, $k_0$, $k_1$, and $k_2$. This fact can be accommodated by using a non-linear standardization transformation, N, as, for example, in the procedural variation described by FIG. 4. For reasons of clarity, the following components are limited; however, to the case of linear standardization procedures. The expansion to the non-linear case is trivial because it only contains an increase in the "dimension" of the color area by expanding the color vector, k, with the powers of $k_0$.

According to FIGS. 5a and 5b the key problem in the determination of the standardization transformation, N, that is best suited to the given order and/or film specific data, is to determine a neutral density axis, $k_0$, which is best suited for a specific film in question. In a color room that is formed by the normed coordinate axes, $k_0'$, $k_1'$, $k_2'$, the determined color plane that is defined by the axes, $k_1'$, $k_2'$, will stand perpendicular to the normed neutral density axis, $k_0'$. Advantageously the color axes, $k_1'$, $k_2'$, are chosen such, that they are vertical to each other. However, their extension is chosen such, that the angles they are enclosing with the original color axes, $k_1$, $k_2$, are as small as possible. In the determination of the normed neutral density axis, $k_0'$, it has to be noted that generally the neutral density axis, $k_0'$, is not only twisted about the origin with respect to the original density axis, $k_0$, as depicted in FIGS. 5a, 5b, but rather that the origin of the new coordinate system also is shifted in the color room.

In determining the standardization transformation, N, that is best suited to the given order and/or film specific data, it is mainly necessary to identify the shift vector, m, which is a measure for the required shift in the origin of the coordinate system in the color area, and to identify the components, $n_{00}$, $n_{01}$, $n_{02}$, of the first line of the standardization transformation matrix, which describes the desired density axis. The components are summarized to form the vector, $d = (n_{00}, n_{01}, n_{02})^T$. Once the shift vector, m, and the vector, d, are present, then the other parameters of the standardization transformation, N, can be determined easily, and, because $D = N^{-1}$, the de-standardization transformation, D, can also be determined because of the marginal condition that the axes of the desired color plane are vertical to the normed neutral density axis, $k_0'$, and to each other.

The easiest way to determine the density axis is by making it possible to expose test images (for example frame series or neutral wedges) onto the film material, then measure and evaluate them. The shift vector, m, and the density axis, d, can then be determined from the measured data. For example, classical regression or compensation procedures can be used. Preferably, however, procedures are used that are based on a so-called characteristic vector analysis.

The use of the characteristic vector analysis in the procedure proposed by the invention is described below. An advantage of the characteristic vector analysis is that it does not require test pictures, but rather is based on a statistical evaluation of the measured data from originals that are dimensioned ordinarily. For photographic pictures, the variability of the color densities is to a much higher extent a function of the differences in the exposure (both individual picture sections as well as entire images) than it is of the color differences in the original scene. As a result, procedures using the main characteristic vector as the density axis, d, that is the characteristic vector with the largest concomitant inherent value, the covariant matrix of the "raw" color vectors, k, have shown to be very suitable. Because of the close connection between exposure and "neutral density", the aforementioned main characteristic vector can be viewed as the "neutral density axis" because the projection of the color vectors onto these axes has the largest possible variation. On the other hand, this selection of the density axis leads to a minimization of the variation in the normed color field, which in turn can be viewed as the essential objective of standardization, but the exposure-specific color variability of the measured data still has to be eliminated.

The individual basic steps for determining the density axis, d, and the shift vector, m, are displayed in FIG. 6. Of course, individual steps of the procedure detailed here can be carried out in ways other than ones described here when put into practice.

1) As a first step, the raw color vectors, k, and the resulting simple correlations matrix sums, K, are accumulated in weighted form on a constant basis. They are accumulated in part for the given film in order to prepare order specific statistics. This results in an order specific correlation matrix sum, $K_0$, and an order specific vector sum, $m_0$. Statistics are also maintained for the type of film being used. In this way, one can also obtain or update film type specific statistics. These result in a film type specific correlation matrix sum, $K_t$, and a film type specific vector sum, $m_t$. Because of the color saturation of the measured color vectors, weighting ($w_0$ and $w_t$) is given to each of the two sets of statistics in order to give greater consideration to the more color neutral values. The distance of the color vector, as measured on the color field, from one of the reference vectors or from an estimate for the basic coloration of the given film (for example, the color vector of the "thinnest" point, as it is described, for example, in DE-A-33,17,818) is used as an index for saturation.

At the beginning of the accumulation, the order specific correlation matrix sum, $K_0$, is set equivalent to the zero matrix and the order specific vector sum, $m_0$, is set equal to the zero vector. The order specific weighting, $w_0$, initially also gets a value of 0. The initial value of the film type specific correlation matrix sum, $K_t$, the film type specific vector sum, $m_t$, and the film type specific weight, $w_t$, initially receive values that were derived from prior originals. The new values are derived in each accumulation step (for each color vector, k) from the values of the previous step and from the current color vector and/or its weighting, on the basis of the following equations:

$$K_0: = K_0 + wkk^T \quad m_0: = m_0 + wk \quad w_0: = w_0 + w$$

$$K_t: = K_t + wkk^t \quad mt: m_t + wk \quad w_t: = w_t + w$$

2) As soon as the amount of copying light is required for an original, V, then a standardization of the accumulated correlation matrix sums and of the vector sums takes place, in preparation for the determination of the current transformation. The result is respective shift vectors, $m_0$ and $m_t$, and respective correlation matrices, $K_0$ and $K_t$, for the given film and the film type, determined on the basis of the following equations:

$$K_0: = K_0/w_0 \quad m_0: = m_0/w_0$$

$$K_t: = K_t/w_t \quad m_t: = m_t/w_t$$

3) By means of weighted messages, the final shift vector, m, and a total covariance matrix, K, are determined from both statistics in another step. The weighting is done with the objective of giving due consideration to the more color neutral values. If the color vectors are based on the sectional measurement of relatively few or few representative originals being copied, then preferably the film type specific statistics are given a higher weight. The weighting, applied to both sets of statistics, is performed in the following fashion:

$$g_t = 1 - g_0, \text{ where } 0 \leq g_0 \leq 1$$

The equation for the final shift vector is:

$$m: = g_0 m_0 + g_t m_t$$

The total covariance matrix is established in two steps. The equations for these steps are as follows:

$$\text{a) } K: = g_o K_o + g_t K_t \quad \text{b) } K: = K - m\, m^T$$

4) In a fourth step, the main characteristic vector, d, of the covariance matrix, K, is determined. Simple vector iteration procedures, such as the Mises procedure (which is described, for example, in "I. N. Bronstein, K. A. Semendyayev: Taschenbuch det Mathematik [Pocketbook of Mathematics], 19th edition, Harri Deutsch Publishers, Thun, 1980) are used for this purpose.

5) In case, for example, only relatively few measurement data are available for the evaluation, then it may be advantageous to limit the degree of permissible rotation, $\alpha$, of the coordinate system of the color field, particularly of the neutral density axis, to a maximum permissible value, $\alpha_{max}$' and/or to limit the amount of the shift vector, m, to a maximum permissible value.

Figure 7A:
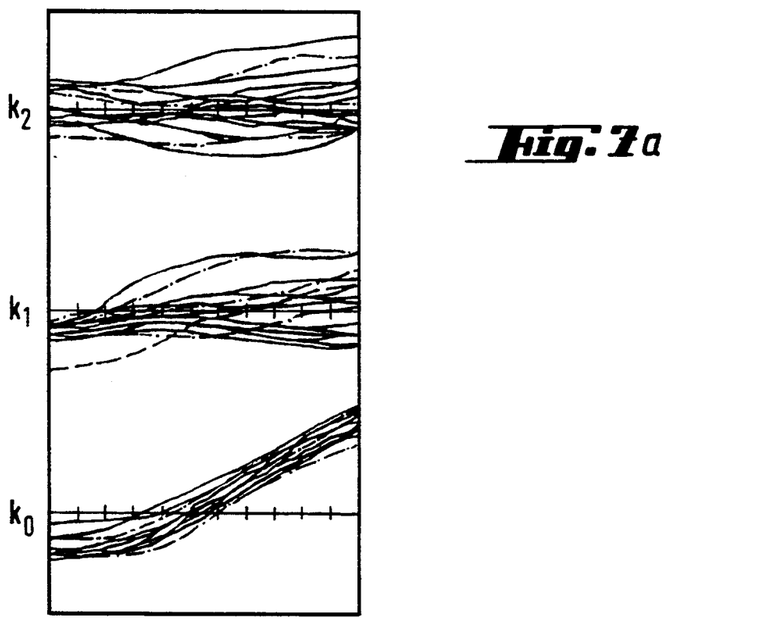
FIGS. 7a-7d show a color diagram of a frame series on the gray scale, exposed to different types of film, before and after application of a procedure based on the invention (18 different types of film, 11 negatives per frame series)
Figure 7B:
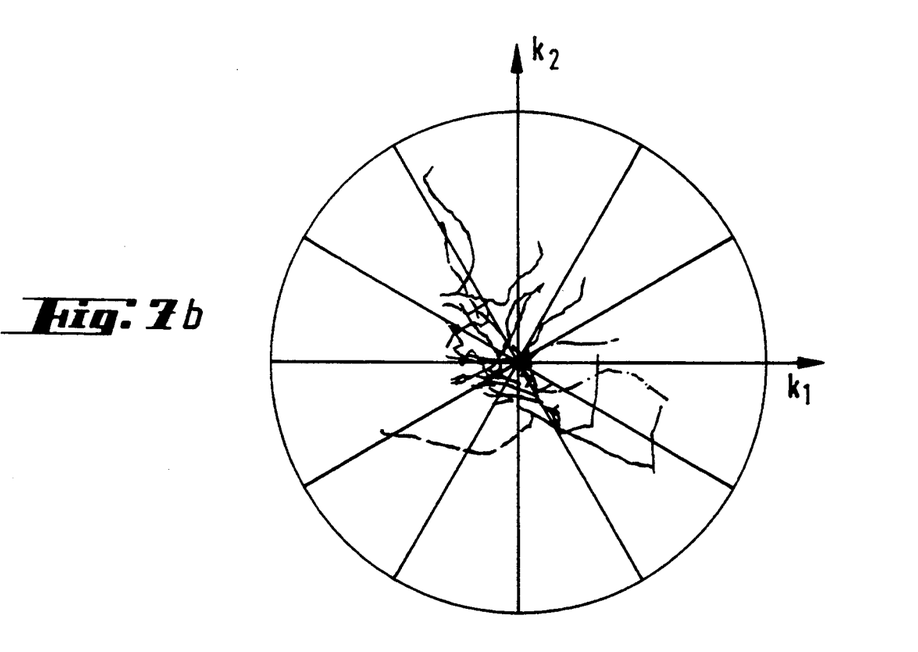

The effectiveness of the procedure presented by the invention is shown in diagrams 7a to 7d. In two different ways, FIGS. 7a and 7b show the "raw" measured data, resulting from the measurement of the original being copied, specifically from negatives, of different film types. The negatives are frame series, starting with a normed gray scale. Per film, one frame series with 12 negatives were exposed. On the color field depicted in FIG. 7b, the 12 measured values of a film are connected by a line. In FIG. 7a, the 12 measured values of a film are also connected by a line. But the three color values are indicated separately and as a function of the exposure. The illustrations in 7a and 7b indicate that each film has a characteristic exposure-specific coloration process and its own basic coloration. In practice, this fact makes it difficult to recognize reliably color neutral sections of the original being copied.

Figure 7C:
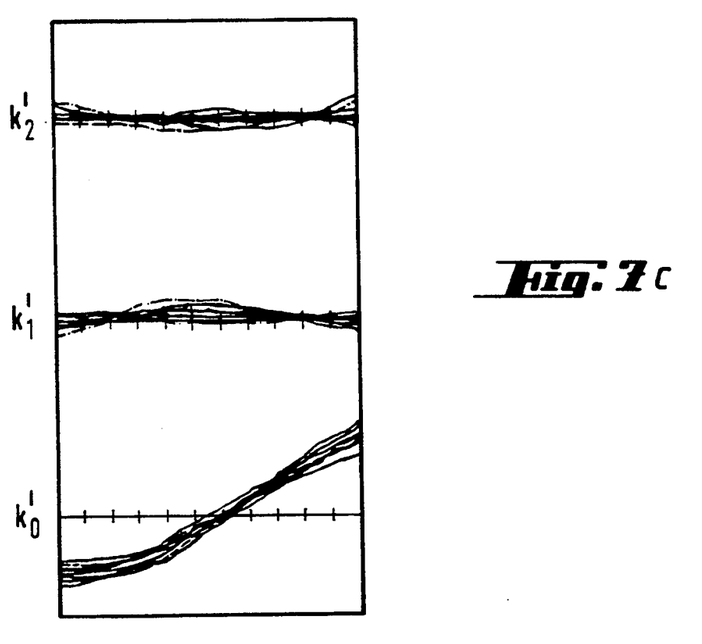
Figure 7D:
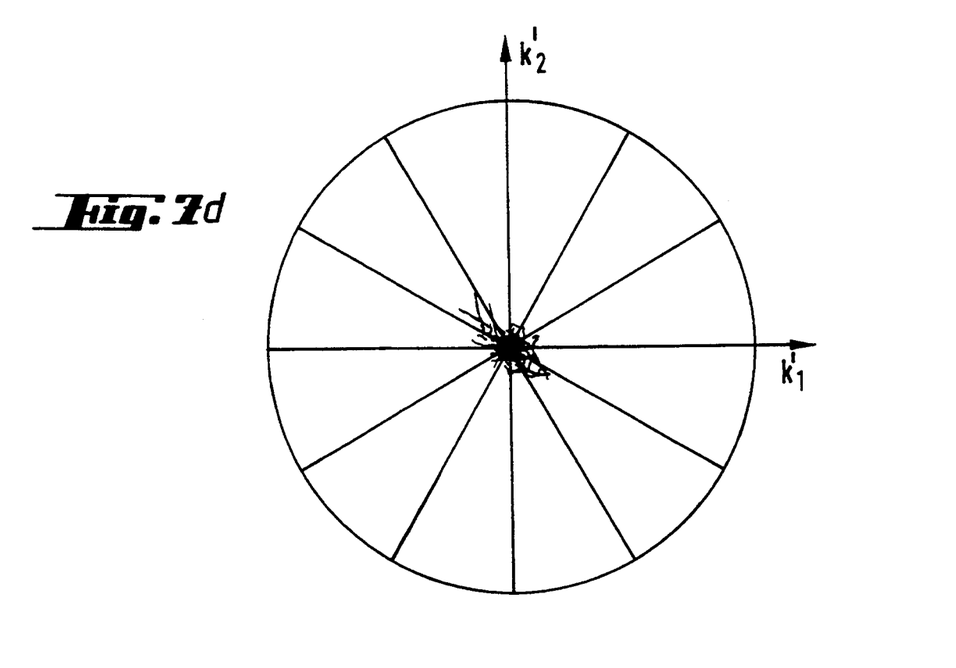

The same data after standardization are depicted in FIGS. 7c and 7d. For this purpose, only the measured data from the negatives of each film, i.e., the order specific statistics, were used for the determination of the standardization transformation, N. The film specific color distortions have been reduced to such a degree that they are practically irrelevant. By using the inverse transformation, the normed data can again be re-transformed into the original "raw data".

Figure 8A:
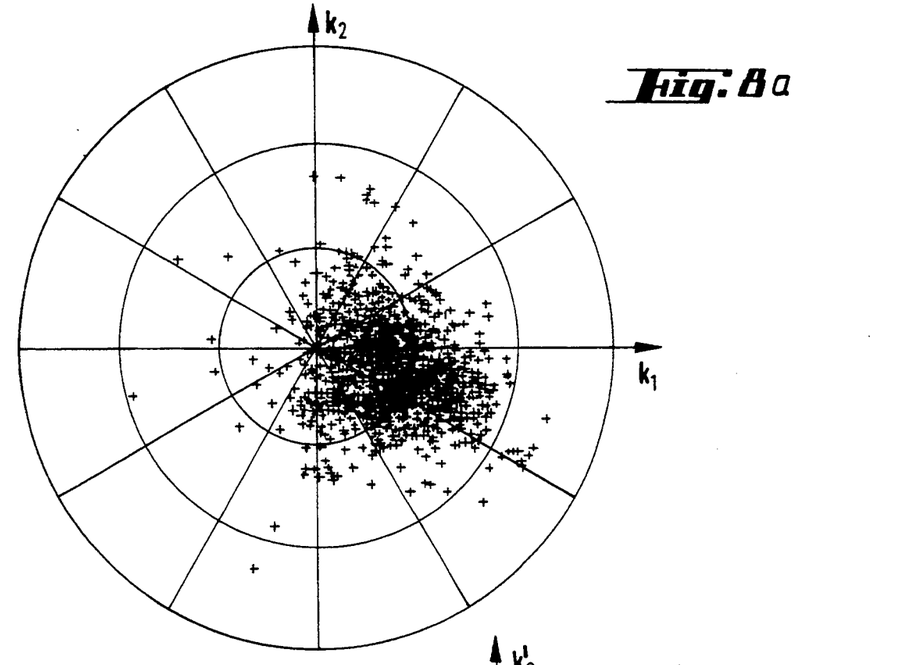
FIGS. 8a and 8b show a "Color Scatter Plot" of originals of different film manufacturers, before and after application of a procedure based upon the invention.
Figure 8B:
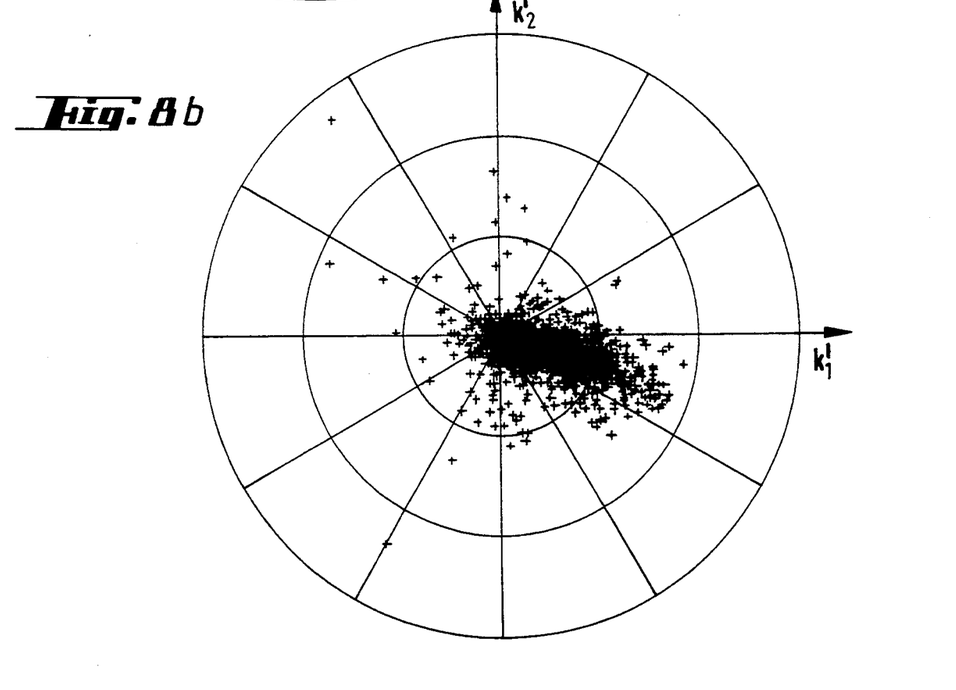

The distribution of measured values on the color field is shown in FIGS. 8a and 8b; this scatter graph is derived from a number of original negatives. The broad scattering of the "raw data" can clearly be seen in FIG. 8a. The same data after standardization are depicted in FIG. 8b. One can recognize a clear accumulation of data points along the C-axis. The remaining differences primarily involve color saturation and not color tinting. They reflect the actual variability with which the "ideal color" can appear. On the basis of this example, it is clear that when using a procedure presented by the invention, in particular after standardization of the "raw data," ideals in the original being copied can be reliably recognized and, thereby, there can result better reproductions of pictures taken against the light, which usually cause certain problems when color originals are copied automatically. The use of a procedure based on the invention also allows highly reliable recognition of skin color, artificial light, vegetation, etc.

As can be seen from the example shown in FIGS. 7a to 7d, the procedure based on the invention can also be used if only one of the two sets of statistics—the order specific or the film type specific statistics—is available.

The application of procedures based upon the invention allows for an analysis of the picture content that is considerably more reliable in comparison with known systems because it is based on color data, which are largely unencumbered by film-generated color distortions. Another advantage of the procedure consists of improving in simple fashion the quality of conventional analysis programs by connecting a standardization unit and a corresponding de-standardization unit without requiring large-scale changes to the entire system.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. Process for making copies of photographic originals on a film in a photographic copying machine, comprising the steps of:

sectionally scanning an original being copied by a measurement system in a measurement station of the photographic color copying machine;

feeding measured light that is transmitted or remitted from each scanned section of the original being copied to a detector;

converting the measured light into electrical signals as a function of wavelength and intensity of the measured light;

digitizing the electrical signals to obtain color data for processing in a computation and evaluation unit;

analyzing the color data in an analysis unit to establish correction values, said step of analyzing further including steps of:

(a) subjecting said color data to a reversible linear or non-linear standardization transformation which is determined from order specific statistics, or from film type specific statistics, or from a weighted combination of the order specific statistics and the film type specific statistics, and thus converting said color data into normalized color values to provide initial data for the analysis unit;

(b) forming normalized correction values which are not film specific in the analysis unit from the normalized color values, thereby taking into account color, density, and structural characteristics of the original being copied;

(c) converting the non-film specific normalized correction values of the analysis unit into de-standardized correction values in a de-standardization unit using a de-standardization transformation which is inverse to the standardization transformation, said de-standardized correction values taking into account again color characteristics of film material being copied;

determining a required amount of copying light from the de-standardized correction values in an exposure calculation unit; and making copies from the original being copied in an exposure station based on said copying light.

2. Process according to claim 1, further including the steps of:

compressing the digitized color data in a data reduction stage, if the number of digitized color data of a scanned section of the original being copied is larger than three, and determining three raw color values from the color data to form a characteristic vector for the standardizing unit, with one of the color values representing a neutral density and the other two color values corresponding to color coordinates of an image point in a color field having coordinate axes determined by the raw color values; and subjecting the digitized color data, if the number of color measured data is three and they correspond to the color densities of the three basic colors of red, green, and blue, to automatic pre-transformation such that three raw color values are generated which each form one characteristic vector for the standardization unit, with one of the color values representing a neutral density and the other two color values corresponding to color coordinates of an image point in said color field.

3. Process according to claim 2, further comprising the step of:

expanding, for a non-linear standardization transformation, the characteristic vector of the standardization unit by other components, which are preferably formed by exponents of the first components.

4. Process according to claim 3, further including the step of:

identifying and statistically evaluating the raw color values for determining the standardization transformation.

5. Process according to claim 4, further comprising the step of:

selecting the standardization transformation such that it forms a unitary matrix.

6. Process according to claim 5, further comprising the step of:

establishing the standardization transformation on an updated basis for each original being copied from a weighted combination of the order specific statistics and the film type specific statistics, said step of establishing the standardization transformation further including the steps of:

accumulating given raw color vectors and resulting correlation matrices on a weighted basis, with an order specific correlation matrix and an order specific shift vector as well as a film type specific correlation matrix and a film type specific shift vector, with weights for each of the order specific statistics and the film type specific statistics being determined on the basis of a color saturation of the measured color vectors;

determining a final shift vector and a total covariance matrix, using weighted messages, from the order specific statistics and the film type specific statistics;

determining a main characteristic vector of the covariance matrix;

determining other components of the standardization transformation matrix and, because $D=N_{-1}$, the de-standardization transformation, from information about the shift vector and the main characteristic vector, whose components represent components of a first line of the standardization transformation matrix, provided axes of a desired color level are perpendicular to a normalized neutral density axis and to each other.

7. Process according to claim 6, further comprising the step of:

determining the de-standardized correction values for a certain original being copied directly before desired color copies are made so that measurement data derived from the original being copied provides a current standardization transformation; and subjecting resulting normalized correction values to a current de-standardization transformation which is inverse to the given standardization transformation.

8. Process according to claim 1, wherein said step of sectionally scanning further includes a step of:

scanning the original on a point-by-point basis; and spectrally dividing said measured light that is transmitted or remitted from each scanned section of the original being copied.

9. Process for copying a photographic original from a film onto a copying material in a photographic copying machine, comprising the steps of:

scanning the original by a measurement system in the photographic color copying machine to obtain color data for processing in a computation and evaluation unit;

analyzing the color data in an analysis unit to establish correction values, said step of analyzing further including steps of:

(a) subjecting said color data to a standardization transformation which is determined from film data statistics, or from film type specific statistics, or from a weighted combination of the film data statistics and the film type specific statistics, and thus converting said color data into normalized color values;

(b) forming normalized correction values which are not film specific in the analysis unit from the normalized color values, taking into account characteristics of the original being copied;

(c) converting the non-film specific normalized correction values of the analysis unit into de-standardized correction values using a de-standardization transformation which is inverse to the standardization transformation, said de-standardized correction values taking into account characteristics of said film;

determining a required amount of copying light from the de-standardized correction values in an exposure calculation unit; and copying the original in an exposure station based on said copying light.

10. Process according to claim 9, further comprising the steps:

feeding measured light that is transmitted or remitted from scanned sections of the original to a detector;

converting the measured light into electrical signals as a function of wavelength and intensity of the measured light; and digitizing the electric signals to obtain the color data.

11. Process according to claim 10, further including the steps of:

compressing the digitized color data in a data reduction stage, if the number of digitized color data of a scanned section of the original being copied is larger than three, and determining three raw color values from the color data to form a characteristic vector for the standardization transform, with one of the color values representing a neutral density and the other two color values corresponding to color coordinates of an image point in a color field having coordinate axes determined by the raw color values; and subjecting the digitized color data, if the number of color measured data is three and they correspond to the color densities of the three colors to automatic pre-transformation such that three raw color values are generated which each form one characteristic vector for the standardization transform, with one of the color values representing a neutral density and the other two color values corresponding to color coordinates of an image point in said color field.

12. Process according to claim 11, further comprising the step of:

expanding, for a non-linear standardization transformation, the characteristic vector of the standardization transform by other components formed by exponents of the first components.

13. Process according to claim 12, further including the step of:

identifying and statistically evaluating the raw color values for determining the standardization transformation.

14. Process according to claim 13, further comprising the step of:

selecting the standardization transformation such that it forms a unitary matrix.

15. Process according to claim 14, further comprising the step of:

establishing the standardization transformation on an updated basis for each original being copied from a weighted combination of the film data statistics and the film type specific statistics, said step of establishing the standardization transformation further including the steps of:

accumulating given raw color vectors and resulting correlation matrices on a weighted basis, with a film data correlation matrix and a film data shift vector as well as a film type specific correlation matrix and a film type specific shift vector, with weights for each of the film data statistics and the film type specific statistics being determined on the basis of a color saturation of the measured color vectors; determining a final shift vector and a total covariance matrix, using weighted messages, from the film data statistics and the film type specific statistics;

determining a main characteristic vector of the covariance matrix;

determining other components of the standardization transformation matrix and the de-standardization transformation, from information about the shift vector and the main characteristic vector, whose components represent components of a first line of the standardization transformation matrix, provided axes of a desired color level are perpendicular to a normalized neutral density axis and to each other.

16. Process according to claim 15, further comprising the step of:
    determining the de-standardized correction values for a certain original being copied directly before desired color copies are made so that measurement data derived from the original being copied provides a current standardization transformation; and
    subjecting resulting normalized correction values to a current de-standardization transformation which is inverse to the given standardization transformation.

17. Process according to claim 9, wherein said step of scanning further includes a step of:
    scanning the original on a point-by-point basis; and
    spectrally dividing measured light that is transmitted or remitted from each scanned section of the original to be copied.

* * * * *